United States Patent
Arzoumanidis et al.

(10) Patent No.: US 11,448,605 B2
(45) Date of Patent: Sep. 20, 2022

(54) SCANNER LOAD FRAME

(71) Applicant: Psylotech, Inc., Evanston, IL (US)

(72) Inventors: G. Alexis Arzoumanidis, Glenview, IL (US); Andrew Panahon, Chicago, IL (US)

(73) Assignee: PSYLOTECH, INC., Evanston, IL (US)

( * ) Notice: Subject to any disclaimer, the term of this patent is extended or adjusted under 35 U.S.C. 154(b) by 135 days.

(21) Appl. No.: 16/791,646

(22) Filed: Feb. 14, 2020

(65) Prior Publication Data
US 2020/0300785 A1   Sep. 24, 2020

Related U.S. Application Data

(60) Provisional application No. 62/805,795, filed on Feb. 14, 2019.

(51) Int. Cl.
*G01N 23/04*       (2018.01)
*G01N 23/046*    (2018.01)

(52) U.S. Cl.
CPC ........... *G01N 23/046* (2013.01); *G01N 23/04* (2013.01); *G01N 2223/3306* (2013.01)

(58) Field of Classification Search
CPC ................. G01N 23/046; G01N 23/18; G01N 2223/3306; G01N 23/04
USPC ......... 378/4, 10, 19, 57, 58, 208, 20, 53–55, 378/195–198
See application file for complete search history.

(56) References Cited

U.S. PATENT DOCUMENTS

| | | | | |
|---|---|---|---|---|
| 4,989,225 A * | 1/1991 | Gupta | ................. | G01N 23/046 378/10 |
| 5,119,408 A * | 6/1992 | Little | ................... | G01N 23/046 378/10 |
| 5,164,971 A * | 11/1992 | Peyret | ................... | G06T 11/005 378/19 |
| 5,463,667 A * | 10/1995 | Ichinose | .............. | H05K 13/082 378/58 |
| 6,104,776 A * | 8/2000 | Oikawa | ............ | G01N 23/20025 378/22 |
| 6,459,760 B1 * | 10/2002 | D'Ambrosio | .......... | G01N 23/04 378/43 |
| 7,082,182 B2 * | 7/2006 | Zhou | .................... | A61B 6/4028 378/10 |
| 7,356,115 B2 * | 4/2008 | Ford | .................... | G01N 23/046 378/4 |

(Continued)

*Primary Examiner* — Allen C. Ho
(74) *Attorney, Agent, or Firm* — The Watson IP Group, PLC; Jovan N. Jovanovic

(57) ABSTRACT

An apparatus comprises a base plate, a first fixed post, a second fixed post, a first actuator, a second actuator, a third actuator, a first test sample grip, and a second test sample grip. The first fixed post and the second fixed post are coupled to the base plate at one side thereof. The first actuator, coupled to the first fixed post and the second fixed post, rotates a test sample along an axis that runs parallel to and halfway between the first fixed post and the second fixed post. The second actuator, coupled to the first fixed post and the second fixed post, displaces the test sample along the axis that runs parallel to and halfway between the first fixed post and the second fixed post. The third actuator, coupled to the first fixed post and the second fixed post, rotates the test sample along the axis that runs parallel to and halfway between the first fixed post and the second fixed post.

21 Claims, 15 Drawing Sheets

(56) References Cited

U.S. PATENT DOCUMENTS

| | | | |
|---|---|---|---|
| 7,551,714 B2* | 6/2009 | Rothschild | G01N 23/046 |
| | | | 378/44 |
| 7,876,875 B2* | 1/2011 | Warner | G01N 23/046 |
| | | | 378/20 |
| 8,422,626 B2* | 4/2013 | Jin | G01N 23/046 |
| | | | 378/10 |
| 9,025,724 B2* | 5/2015 | Lee | G01N 23/046 |
| | | | 378/10 |
| 9,234,855 B2* | 1/2016 | Watanabe | G01N 23/04 |
| 10,067,077 B2* | 9/2018 | Blank | H02N 2/0095 |
| 10,151,810 B2* | 12/2018 | Gregerson | G01R 33/4812 |
| 10,234,407 B2* | 3/2019 | Li | G01N 23/046 |
| 10,393,678 B2* | 8/2019 | Watanabe | G01N 23/046 |
| 10,705,030 B2* | 7/2020 | Watanabe | H01J 35/08 |
| 10,801,972 B2* | 10/2020 | Wuestenbecker | G01N 23/046 |
| 11,262,318 B2* | 3/2022 | Salamon | G01N 23/046 |

* cited by examiner

SCANNER LOAD FRAME

CROSS-REFERENCE TO RELATED APPLICATION

This application claims priority from U.S. Application Ser. No. 62/805,795 filed Feb. 14, 2019, entitled "Scanner Load Frame", the entire disclosure of which is hereby incorporated by reference in its entirety.

BACKGROUND OF THE DISCLOSURE

1. Field of the Disclosure

The disclosure relates in general to a load frame, and more particularly, to a scanner load frame.

2. Background Art

Rotating load frames exist, such as computed tomography (CT) compatible load frames from Deben and Instron. These frames put a rotation stage within an axial load frame. Deben's model CT10 kN apparently has a stage on its bottom that moves up and down to provide linear actuation. Based on how Deben builds load frames, linear motion most likely includes a gearbox. Looking at the stage, it appears their design approach is to decouple linear motion from rotation and torque. Their actuators are not concentric, and alignment is clean. The CT10 kN also applies 100 Nm of torque.

Gripping with Deben's load frame reveals the load frame's limitations for out-of-plane motion. Their tension grip is not symmetric, consisting of a machined pocked and a bolted-in plate. Aligning the specimen axisymmetrically is difficult. Precise alignment left to right is practically impossible and centerline alignment through the thickness depends on the specimen's thickness dimension, which can vary. Moreover, specializing grips for tension are counterproductive to universal testing and gripping variety.

An established method for mechanical testing in CT scanners is to implement a polymer cylinder as the support structure, then rotate the entire frame 360 degrees on the existing rotation stage. The thin polymer is relatively transparent to the X-rays, compared to the sample. The loss in image quality is deemed minimal. Examples of this solution are Deben's model CT5000 and load frames by Prof. Brian Bay at Oregon State University.

The cylinder solution has three main problems. First, sample mounting is difficult. Second, the source cannot be placed near the specimen, reducing maximum spatial resolution. Third, image quality is unacceptable for relatively X-ray transparent materials, like plastic, rubber, and/or soft tissue.

Another competing technology includes use of three aluminum posts in the support structure near the detector. Sample mounting is somewhat simplified compared to the cylinder solution, but the source distance remains a problem.

SUMMARY OF THE DISCLOSURE

The disclosure is directed to an apparatus that is comprised of a base plate, a first fixed post, a second fixed post, a first actuator, a second actuator, a third actuator, a first test sample grip, and a second test sample grip. The first fixed post is coupled to the base plate at one side thereof. The second fixed post is coupled to the base plate at the one side thereof. The first actuator, coupled to the first and second fixed posts, rotates a test sample along an axis that runs parallel to and halfway between the first and second fixed posts. The second actuator, coupled to the first and second fixed posts, displaces the test sample along the axis that runs parallel to and halfway between the first and second fixed posts. The third actuator, coupled to the first and second fixed posts, rotates the test sample along the axis that runs parallel to and halfway between the first and second fixed posts. The first test sample grip, coupled to the third actuator, grips the test sample at a first end thereof. The second test sample grip, coupled to the second actuator, grips the test sample at a second end thereof.

It is contemplated that the apparatus further comprises a load cell, coupled to the third actuator and rotated by the third actuator, to generate an electrical signal, with a magnitude of the electrical signal being directly proportional to a force being applied to the test sample.

It is contemplated that the apparatus further comprises a strain wave gear coupled to the second actuator.

It is contemplated that the apparatus further comprises a strain wave gear couple to the third actuator.

It is contemplated that the first actuator rotates a first nut coupled to the second actuator and the second actuator rotates a second nut coupled to the second test sample grip.

It is contemplated that the first nut is one of a roller screw nut and ball screw nut.

It is contemplated that the second nut is a spline nut.

It is contemplated that the first and second test sample grips are axisymmetric grips.

It is contemplated that the first, second, and third actuators are coaxial servo-actuators.

It is contemplated that apparatus is disposed within a temperature chamber during testing of the test sample, the test chamber at least one of heating and cooling the test sample during the testing of the test sample.

It is contemplated that the first and second test sample grips are collet grips.

It is contemplated that the load cell includes a rotating electrical connector.

It is contemplated that a scanning system is comprised of the apparatus, wherein the scanning system is further comprised of a source and a detector, the first and third actuators rotating in coordination to rotate the test sample for analysis of the test sample by the scanning system without obstruction by the first and second fixed posts.

It is contemplated that the source is an X-ray source and the detector is an X-ray detector.

The disclosure is also directed to a method comprising coupling a first fixed post to a base plate at one side thereof, coupling a second fixed post to the base plate at the one side thereof, coupling a first actuator to the first and second fixed posts, coupling a second actuator to the first and second fixed posts, the second actuator to apply at least one of a torsional force and an axial force to the test sample, coupling a third actuator to the first and second fixed posts, the first and third actuators to rotate in coordination the test sample along an axis that runs parallel to and halfway between the first and second fixed posts, coupling a first test sample grip to the third actuator, the first test sample grip to grip a test sample at a first end thereof, and coupling a second test sample grip to the second actuator, the second grip to grip the test sample at a second end thereof.

It is contemplated that the method further comprises coupling a first strain wave gear to the second actuator and coupling a second strain wave gear to the third actuator.

It is contemplated that the method further comprises rotating, by the first actuator, one of a roller screw nut and ball screw nut coupled to the second actuator, and rotating, by the second actuator, a spline nut coupled to the second test sample grip.

It is contemplated that the rotating of the method further includes rotating the test sample for analysis of the test sample by a scanning system without obstruction by the first and second fixed posts.

It is contemplated that the first and second test sample grips of the method are axisymmetric grips.

It is contemplated that the first, second, and third actuators of the method are coaxial servo-actuators.

It is contemplated that the method further comprises coupling a load cell to the third actuator, the load cell generating an electrical signal, with a magnitude of the electrical signal being directly proportional to a force being applied to the test sample.

BRIEF DESCRIPTION OF THE DRAWINGS

The disclosure will now be described with reference to the drawings wherein.

DETAILED DESCRIPTION OF THE DISCLOSURE

Figure 1:
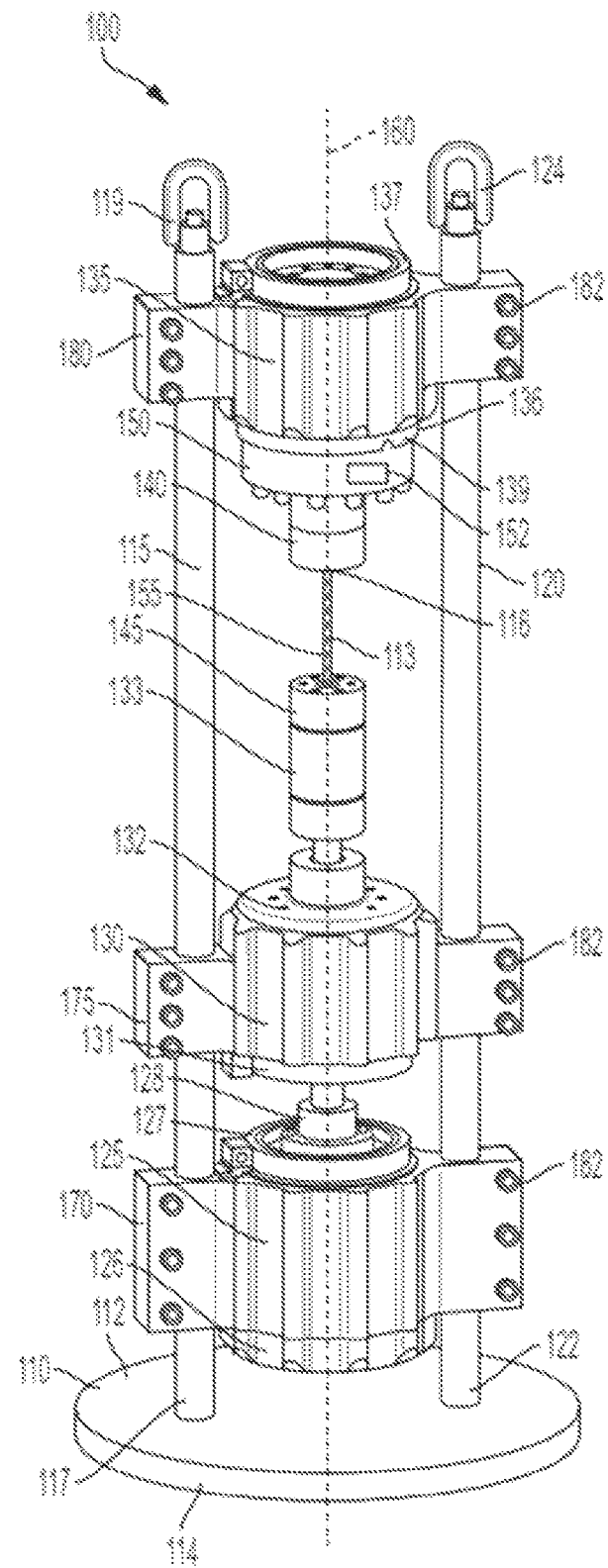
FIG. 1 illustrates an isometric view of an example apparatus, such as a load frame, in accordance with one or more embodiments disclosed herein.

While this disclosure is susceptible of one or more embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

The embodiments disclose herein a mechanical testing frame, or load frame, for scanners, such as industrial computed tomography (CT), micro CT, and/or in advanced photon sources. The CT scanning process requires a test sample be rotated 360 degrees relative to a source/detector pair, such as an X-ray source/detector pair. The embodiments rotate the load train, so load frame pillars remain stationary and do not obstruct the source/detector pair during operation. Additionally, the embodiments enable the source to be placed close to the test sample, maximizing CT scan resolution. The disclosed embodiments are highly scalable, depending on space limitations and desired force & torque capacity.

At maximum CT resolution, extraneous out-of-plane motion during rotation blurs a generated 3D image. The embodiments solve this problem where rotating a loaded test sample within the load frame causes the sample to move out-of-plane, e.g., which is useful for brittle fatigue analysis. The use of an axisymmetric, triple coaxial servomotor design by the embodiments disclosed herein limits out-of-plane motion. Moreover, in an embodiment in which 2 rotation actuators are coupled to zero-backlash strain wave gears enables substantial torsion in addition to the axial loading capability for the load frame. Maximizing CT resolution is particularly important for an up-and-coming experimental mechanics technique known as Digital Volume Correlation (DVC). The load frame disclosed herein has magnitudes, e.g., 100×, higher resolution than prior art load frames. Moreover, prior art load frames, such as those by Deben and Instron, do not offer same symmetry and precision which minimizing out-of-plane motion as provided by the proposed embodiments.

Figure 2:
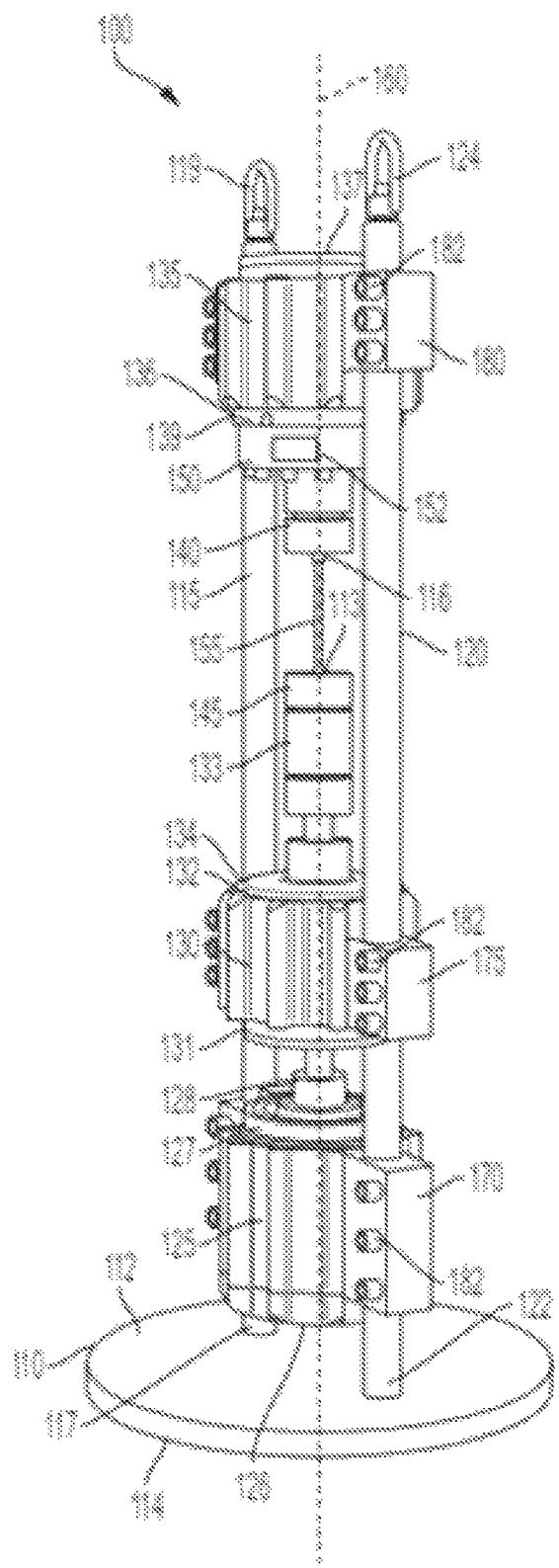
FIG. 2 illustrates a second isometric view of the load frame shown in FIG. 1, in accordance with one or more embodiments disclosed herein.

Referring now to the drawings and in particular to FIG. 1, an apparatus, such as the load frame 100 is disclosed. In an example, load capacities of the load frame 100 span a range from approximately 100 N to 45+kN. FIG. 2 illustrates a second isometric view of the load frame illustrated in FIG. 1. The load frame 100 includes a base plate 110, a first fixed post 115, a second fixed post 120, a first actuator 125, a second actuator 130, a third actuator 135, a first test sample grip 140, a second test sample grip 145, and a load cell 150, such as a torsional/axial load cell.

The base plate 110 provides a stable platform to which the first and second fixed posts 115, 120 are coupled. In the example shown, the base plate 110 is circular, although other shapes are possible, such as square, oval, rectangular, or any other shape that provides a stable platform to which the first and second fixed posts 115, 120 are coupled. The first and second fixed posts 115, 120 are fixedly coupled to the base such that the coupling of the base plate 100 to the first and second fixed posts 115, 120 prevents motion therebetween. The first and second fixed posts 115, 120 are fixed to a first side 112 of the base plate 110, with the second side 114 of the base plate 110 being placed on a surface (not shown), such as a table or floor.

Proximate to the base plate 110 is the first actuator 125, such as an axisymmetric direct drive actuator. In at least one embodiment the first actuator 125 is an axisymmetric, triple coaxial servomotor. The first actuator 125 is coupled to the first and second fixed posts 115, 120, proximate to first ends 117, 122 of the first and second fixed posts 115, 120, respectively. The first actuator 125 includes a first end 126 and a second end 127, the first end 126 that is proximate to the base plate 110 and the second end 127 being proximate to a first end 131 of the second actuator 130. In at least one embodiment, the first actuator 125 rotates a ball screw nut or roller screw nut 128, comparable to servohydraulics, that couples the first actuator 125 to the second actuator 130. The ball screw nut or roller screw nut 128 provides control over the speed at which a force is applied to the test sample 155, such as a standard within the industry of approximately 100 mm/sec of movement. The ball screw nut or roller screw nut 128 provides up to approximately 1 m/sec of movement, approximately 9 orders of magnitude greater than that provided by the standard. In at least one embodiment, the ball screw nut or roller screw nut 128 is hard connected to a spline of its coupled actuator, the first actuator 125, such as with welding or a NiTi shrink fit coupling. In at least one embodiment, the ball screw nut or roller screw nut 128 is pre-loaded to remove slack.

The second actuator 130, such as an axisymmetric direct drive actuator, is proximate to and coupled to the first actuator 125. In at least one embodiment the second actuator 130 is an axisymmetric, triple coaxial servomotor. The second actuator 130 is coupled to the first and second fixed posts 115, 120, proximate to the first actuator 125. The second actuator 130 includes a first end 131 that is proximate to the first actuator 125 and a second end 132 that is proximate to the second test sample grip 145. In at least one embodiment, the second actuator 130 rotates a spline nut 133 that is coupled to the second end 132 of the second actuator 130. An opposite end of the spline nut 133 is coupled to the second test sample grip 145. In at least one embodiment, the second actuator 130 is coupled to a strain wave gear 134. The spline nut 133 is closer to the load train, e.g., the first and second test sample grips 140, 145, disclosed verses the ball screw nut or roller screw nut 128 to prevent torque from deforming the ball screw nut or roller screw nut 128 and to prevent the extremely tight tolerances disclosed herein for the ball screw nut or roller screw nut 128 from being lost. In at least one embodiment, the spline nut 133 is pre-loaded to provide zero backlash.

The third actuator 135, such as an axisymmetric direct drive actuator, is proximate to the second ends 119, 124 of the first and second fixed posts 115, 120, respectively. The second ends 119, 124 of the first and second fixed posts 115, 120 are on an opposite end of the first and second fixed posts 115, 120, respectively. In at least one embodiment, the second ends 119, 124 of the first and second fixed posts 115, 120 are not coupled to a top plate, similar to the base plate 110, but in other embodiments the second ends 119, 124 of the first and second fixed posts 115, 120 are coupled to a top plate (not shown). In at least one embodiment the third actuator 135 is an axisymmetric, triple coaxial servomotor. The third actuator 135 is coupled to the first and second fixed posts 115, 120, proximate to the second ends 119, 124 of the first and second fixed posts 115, 120, respectively. The third actuator 135 includes a first end 136 that is proximate to the load cell 150 and a second end 137 that is proximate to the second ends 119, 124 of the first and second fixed posts 115, 120, respectively. In at least one embodiment, the third actuator 135 rotates the load cell 150. In at least one embodiment, the third actuator 135 is coupled to a strain wave gear 139. In at least one embodiment, the second ends 118, 124 are metallic hoops for hanging the load frame 100. The stain wave gears 134, 139 convert an axial force to an axial+torsional force, and can be swapped out to include higher torque capability, e.g., 100×. The stain wave gears 134, 139 have zero backlash and have internally balanced torque. In an alternate embodiment, direct drive eliminating the stain wave gears 134, 139 for torsion is also possible.

In at least one embodiment, the load cell 150 is coupled to the first end 136 of the third actuator 135. The load cell 150 is further coupled to the first test sample grip 140. The load cell 150 generates an electrical signal, with a magnitude of this electrical signal being directly proportional to a force, e.g., torsional force and/or axial force, and displacement being applied to the test sample 155. In at least one embodiment, the load cell 150 includes a rotating electrical connector 152. The rotating electrical connector 152 allows the test sample 155 to be continuously rotated beyond 360 degrees, making possible faster scanning of the test sample 155. In an example, the load cell 150 is a high resolution load sensor. In an example, the load cell 150 is a capacitive bridge, such as a 400 mV/V, versus a conventional 2 mV/V in a strain gauge.

The first, second, and third actuators 125, 130, 135 are mounted onto the first and the second fixed posts 115, 120 via first, second, and third actuator mounts 170, 175, 180, respectively. The first, second, and third actuators 125, 130, 135 are mounted within the first, second, and third actuator mounts 170, 175, 180, respectively, with the first, second, and third actuator mounts 170, 175, 180 encircling the first, second, and third actuators 125, 130, 135, respectively. The first, second, and third actuator mounts 170, 175, 180 fixedly attach the first, second, and third actuators 125, 130, 135, respectively, wherever desired on the first and the second fixed posts 115, 120 via fasteners 182, such as nuts and bolts shown.

The first, second, and third actuators 125, 130, 135, use direct drive that eliminates a need for a gearbox or a pully-based mechanical reduction. The first, second, and third actuators 125, 130, 135 can be off-the-shelf industrial servo drives and/or custom drives. Gearboxes or pully-based mechanical reductions introduce extraneous forces, which twist the load frame and cause out-of-plane motion which lead to image blur. The first, second, and third actuators 125, 130, 135 eliminate such image blur. The first, second, and third actuators 125, 130, 135 rotate the test sample 155 along an axis 160 that runs parallel to and halfway between the first fixed post 115 and the second fixed post 120. Moreover, a speed of the first, second, and third actuators 125, 130, 135 relates to a voltage applied thereto, such that the speed of the actuator is in a control loop, not a position, which allows for momentary instantaneous bursts of acceleration. In at least one embodiment, at least one of the first, second, and third actuators 125, 130, 135 are used with a ring encoder (not shown), such as a Rinishaw ring encoder, that allows shafts to pass therethrough.

During sample testing, the first test sample grip 140 and the second test sample grip 145 are coupled to a test sample 155 at opposite ends thereof 113, 116 and apply clamping forces to the opposite ends 113, 116 of the test sample 155, a while at least one of a torsion and axial force are applied to the test sample 155 via the second actuator 130. In at least one embodiment, the first and second test sample grips 140, 145 are axisymmetric. For example, the first and second test sample grips 140, 145 are a collet, instead of clamped plates used in prior art designs. In other examples, the first and second test sample grips 140, 145 are arcan, compression platens, confined compression, beam bending, or any other grips that minimize motion during testing. In at least one embodiment, the first and second test sample grips 140, 145 are fixed cross-head and T-slot machined from a single block with zero tolerance stackup that helps with alignment of the test sample 155.

Figure 3:
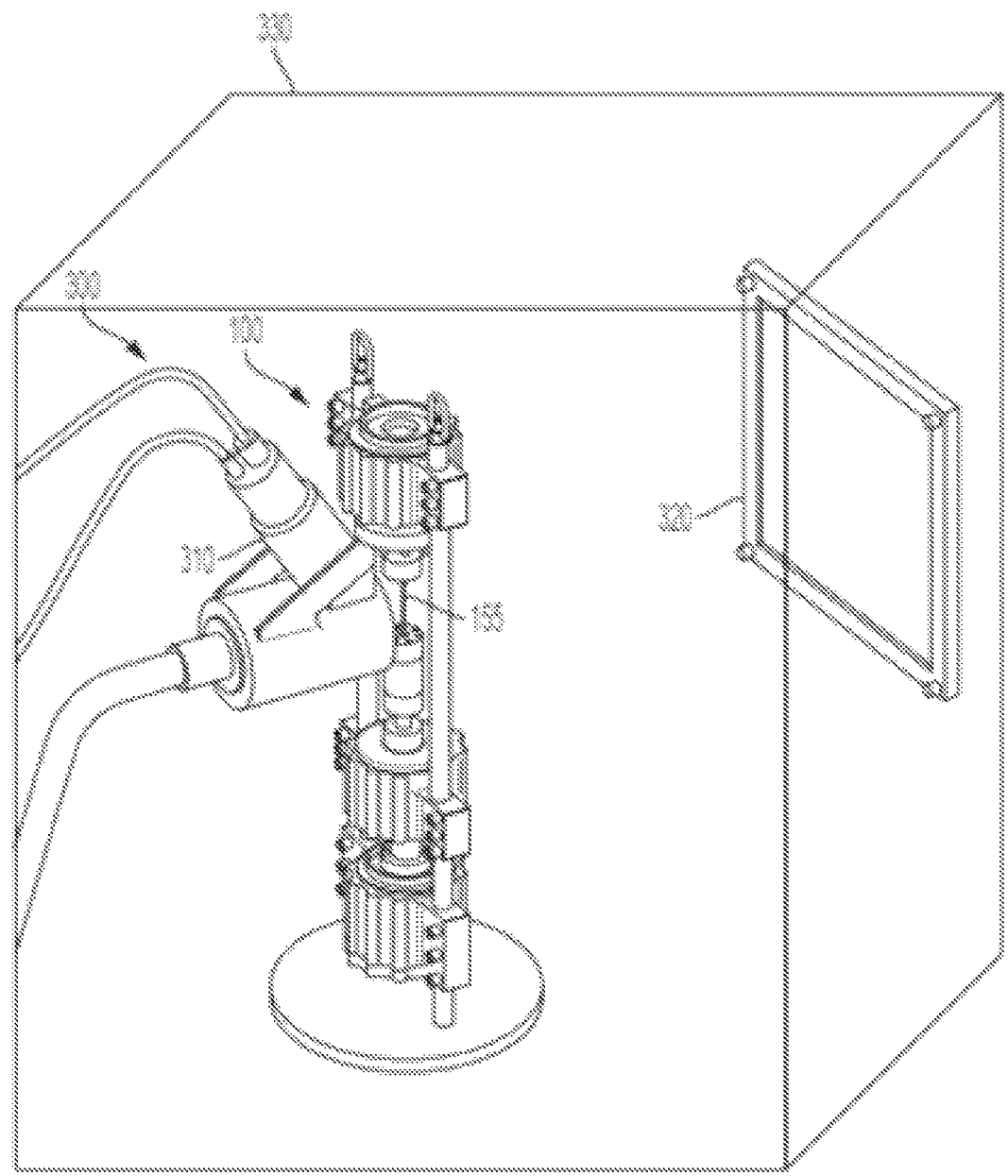
FIG. 3 illustrates an example test system which includes the load frame shown in FIGS. 1 and 2, in accordance with one or more embodiments disclosed herein.

During operation, the second actuator 130 acts as a master actuator. To apply a linear load to the test sample 155, rotation of the third actuator 135 is slaved 1:1 relative to the second actuator 130. First, the rotation of the first actuator 125 is fixed, that is it does not move. Next, the second actuator 130 is rotated to apply a displacement, that is either a positive or negative displacement. Then, the second actuator 130 is slaved to the third actuator 135 to rotate the load train during a scan by a source/scanner 310, 320 (FIG. 3). For torsional loading, with or without the strain wave gearing 134, 139, the second actuator 130 remains the master, but the first actuator 125 is slaved to the second actuator 130. For torsional motion, the third actuator 135 is first fixed. Next, the second actuator 130 is rotated to cause torsional displacement, that is either positive or negative. Then, the second actuator 130 is slaved to the third actuator 135 to rotate the load train during a scan.

High machining tolerances are used on all reference surfaces of the load frame 100. Such high machining tolerances are crucial to minimizing out-of-plane motion. For example, 5 micron tolerances are used that are accomplished by a combination of wire Electrical discharge machining (EDM) and precision turning operations. Moreover, the clamping forces described above are designed perpendicular to the a central axis, such as axis 160 shown, and the clamps themselves are symmetric.

FIG. 3 illustrates a scanning system 300 which includes the load frame 100 shown in FIGS. 1 and 2. In particular, the scanning system 300, such as an X-ray tomography system, an industrial computed tomography (CT) system, micro CT system, and/or an advanced photon scanning system, further includes a source 310, such as an X-ray source, and a detector 320, such as an X-ray detector. The scanning system 300 can be used instead of a microscope, providing sub-voxel resolution of a displacement field. In at least one embodiment, the scanning system 300 provides complete 3D strain fields.

As can be seen, the source 310 is unobstructed when emitting X-rays to the detector 320. During operation of the scanning system 300, the source 310 and detector 320 remain stationary and unobstructed when emitting X-rays to the detector 320, as the test sample 155 is rotated during analysis by the load frame 100. This is in contrast to prior art systems in which a source/detector combination rotates around a test sample. Since the source/detector 310, 320 remain stationary, the source/detector 310, 320 can be placed very close to the test sample 155. Depending upon the configuration of the source/detector 310, 320, the load frame 100 may be turned upside down in order to line up with an axis of the source/detector 310, 320. To simplify integration of the scanning system 300 with existing software, a control computer (not shown) can emulate a rotational stage in software so to the software it appears that the source/detector 310, 320 is moving about a stationary test sample. In at least one embodiment, to protect the source/detector 310, 320 from possible projectiles that may result from a failure of the test sample 155, a shield (not shown) can be placed around the load frame 100.

In one or more embodiments, the load frame 100 is disposed within a temperature chamber 330 that either heats or cools the test sample to a desired temperature during testing. The load frame 100 can be disposed within the temperature chamber 330 with or without including the source/scanner 310, 320 within the temperature chamber 330. In at least one embodiment, the load frame 100 is mounted to the temperature chamber 300 via the first and second fixed posts 115, 120.

Figure 4:
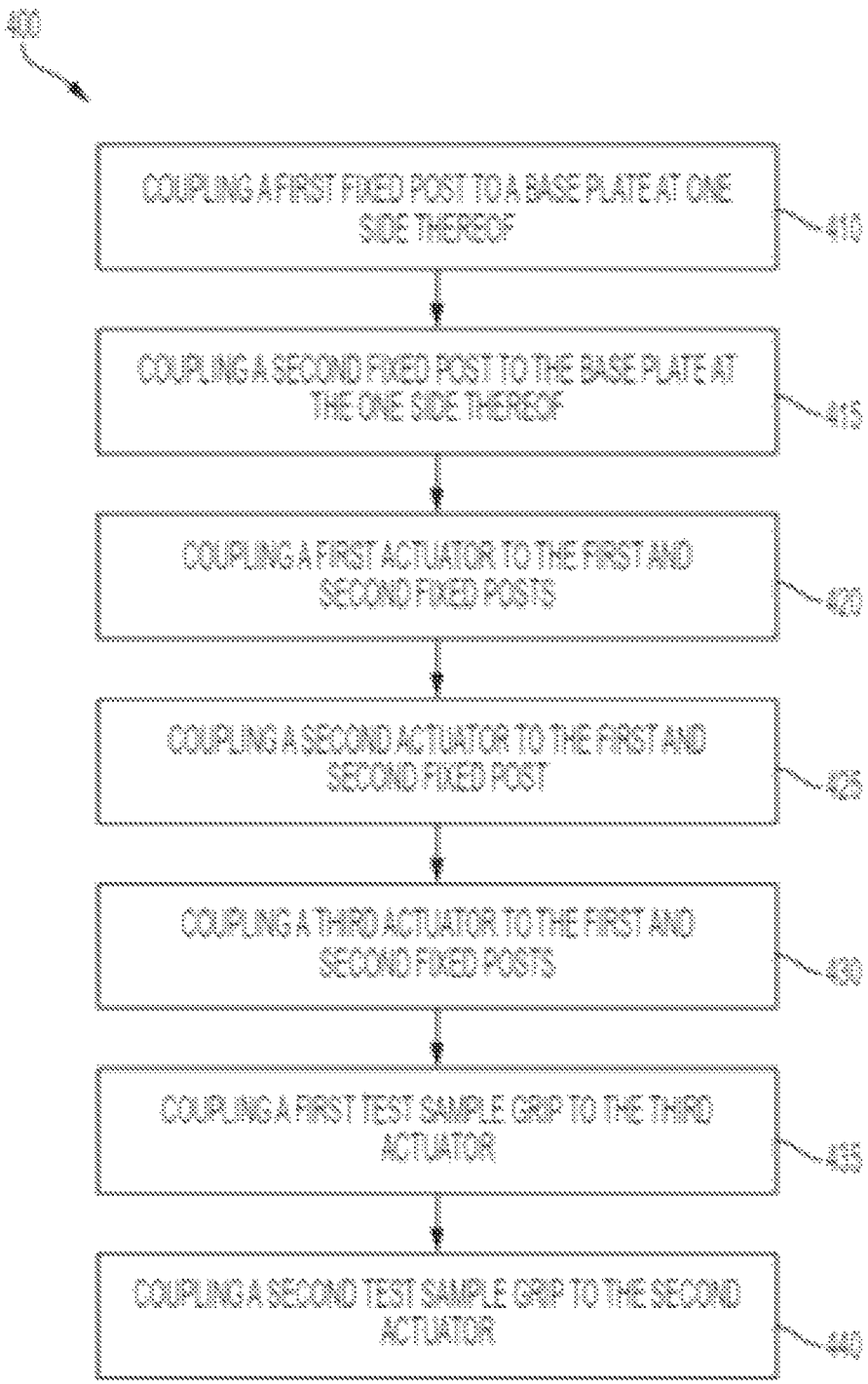
FIG. 4 illustrates an example method of forming the load frame shown in FIGS. 1 and 2, in accordance with one or more embodiments disclosed herein.

FIG. 4 illustrates a method 400 of forming the load frame 100 shown in FIGS. 1 and 2. The method 400 includes processes 410-440. In particular, process 410 includes coupling a first fixed post to a base plate at one side thereof. For example, this first fixed post is the first fixed post 115 and this base plate is the base plate 110, and this one side of the base plate is the first side 112.

Process 415 includes coupling a second fixed post to a base plate at the one side thereof. For example, this second fixed post is the second fixed post 120.

Process 420 includes coupling a first actuator to the first and second fixed posts. For example, this first actuator is the first actuator 125.

Process 425 includes coupling a second actuator to the first and second fixed posts. For example, this second actuator is the second actuator 130. The second actuator applies at least one of a torsional force and an axial force to the test sample.

Process 430 includes coupling a third actuator to the first and second fixed posts. For example, this third actuator is the third actuator 135. The first and third actuators rotate in coordination to rotate the test sample along an axis that runs parallel to and halfway between the first and second fixed posts. For example, this axis is the axis 160.

Process 435 includes coupling a first test sample grip to the third actuator. For example, this first test sample grip is the first test sample grip 140.

Process 440 includes coupling a second test sample grip to the second actuator. For example, this second test sample grip is the second test sample grip 145.

In at least one embodiment, at least one of the processes 410-460 further includes coupling a first strain wave gear to the second actuator and coupling a second strain wave gear to the third actuator. In an example, this first strain wave gear is strain wave gear 134 and the second strain wave gear is strain wave gear 139. In at least one embodiment, at least one of the processes 410-460 further includes rotating, by the first actuator, one of a roller screw nut and ball screw nut coupled to the second actuator and rotating, by the second actuator, a spline nut coupled to the second test sample grip. In an example, this one of a roller screw nut and ball screw nut is the ball screw nut or roller screw nut 128, and the spline nut is the spline nut 133. In at least one embodiment, at least one of the processes 410-460 further includes rotating the test sample for analysis of the test sample by a scanning system without obstruction by the first and second fixed posts. In an example, the scanning system is scanning system 300. In at least one embodiment, the first and second test sample grips of the method 400 are axisymmetric grips. In at least one embodiment, the first, second, and third actuators of the method 400 are coaxial servo-actuators. In at least one embodiment, at least one of the processes 410-460 further includes coupling a load cell to the third actuator and generating an electrical signal with the load cell, a magnitude of the electrical signal being directly proportional to a force being applied to the test sample. In an example, this load cell of the method 400 is the load cell 150.

Figure 5:
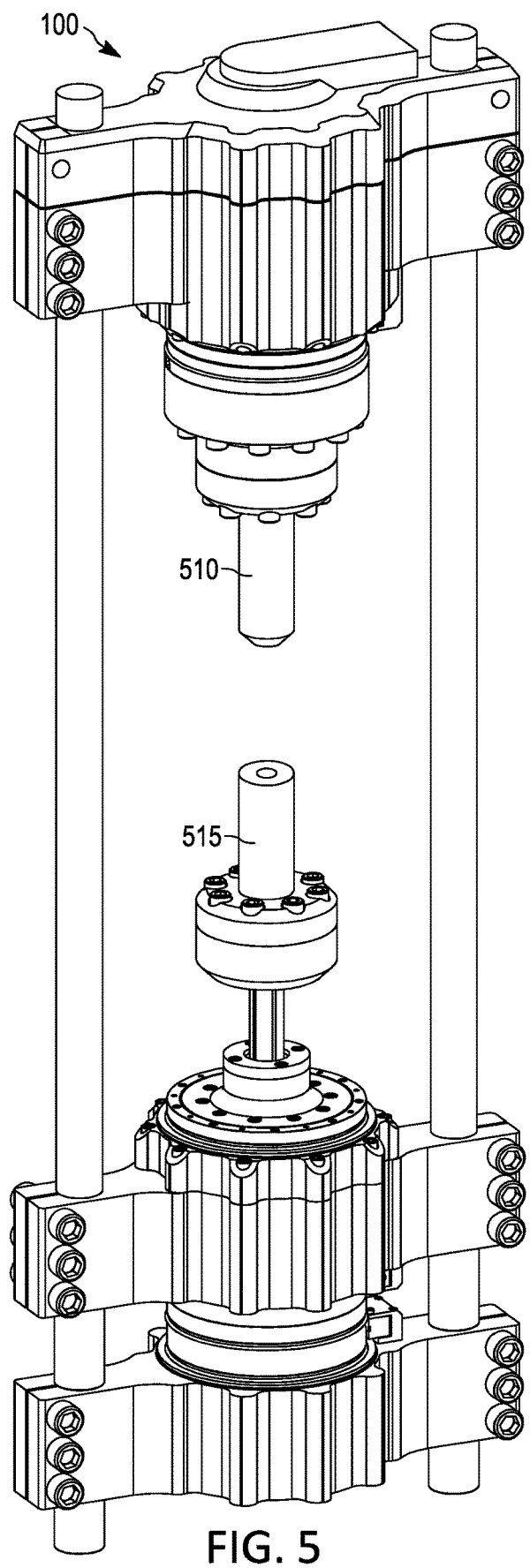
FIG. 5 illustrates an isometric view of the load frame shown in FIGS. 1 and 2 instead including at least one example test sample grip extension, in accordance with one or more embodiments disclosed herein.

FIG. 5 illustrates an isometric view of the load frame 100 shown in FIGS. 1 and 2 instead including at least example one test sample grip extension. For example, the load frame 100 can be fitted with at least one test sample grip extension, such as a first test sample grip extension 510 and/or a second test sample grip extension 515. The first test sample grip extension 510 is coupled to the load cell 150 and the second test sample grip extension 515 is coupled to the spline nut 133. Depending upon the configuration needed to test a particular test sample (not shown), the load frame 100 can include either the first test sample grip extension 510 or the second test sample grip extension 515, and in other configurations both first test sample grip extension 510 and a second test sample grip extension 515 are utilized. In at least one embodiment, the first test sample grip extension 510 and/or the second test sample grip extension 515 are collet grips.

Instead of placing clamping bolts (not shown) on a same plane as ends of the first test sample grip 140 and the second test sample grip 145, the first test sample grip extension 510 and/or the second test sample grip extension 515 are utilized, as shown in FIG. 5. This configuration allows the first test sample grip extension 510 or the second test sample grip extension 515 stay clear of a source, such as source 600 (FIG. 6), to maximize resolution during scanning. The first test sample grip extension 510 and/or the second test sample grip extension 515 allow for use of shorter test samples, eliminating a user having to machine long test samples for every test, if they desire to maximize resolution. The first test sample grip extension 510 and the second test sample grip extension 515 can be made to any length as desired, dependent upon user needs and/or to facilitate scanning. In at least one embodiment, the length of first test sample grip extension 510 and the second test sample grip extension 515 are the same. In at least one other embodiment, the lengths of the first test sample grip extension 510 and the second test sample grip extension 515 are different.

Figure 6:
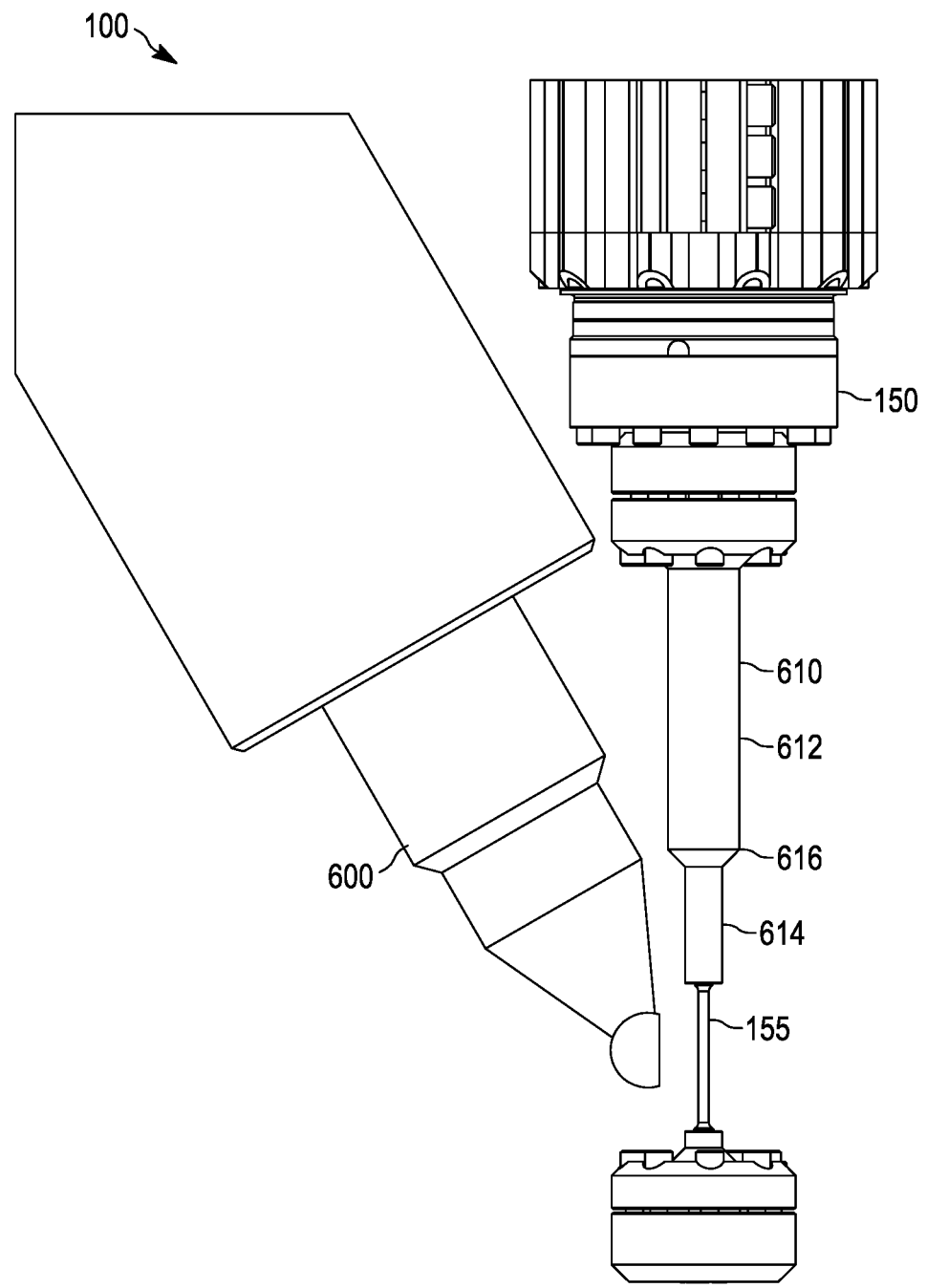
FIG. 6 illustrates a side view of the load frame shown in FIGS. 1 and 2 instead using another example test sample grip extension, in accordance with one or more embodiments disclosed herein.

FIG. 6 illustrates a side view of the load frame 100 shown in FIGS. 1 and 2 instead using another example first test sample grip extension 610. This first test sample grip extension 610 is coupled to the load cell 150. The first test sample grip extension 610 tapers from wider upper segment 612 that is coupled to the load cell 150 to a narrower lower segment 614 that is coupled to the test sample 155. A tapered region 616 (e.g., chamfered), between the upper segment 612 and the lower segment 614, can be located anywhere between the load cell 150 and the test sample 155 to prevent interference between the source 600 and the load frame 100. In at least one embodiment, the source 600 is disposed proximate to the test sample 155 at acute angle (e.g., 30 degrees) relative to the test sample 155 which places the source 600 also proximate to the load frame 100, in some configurations particularly the load cell 150.

Figure 7:
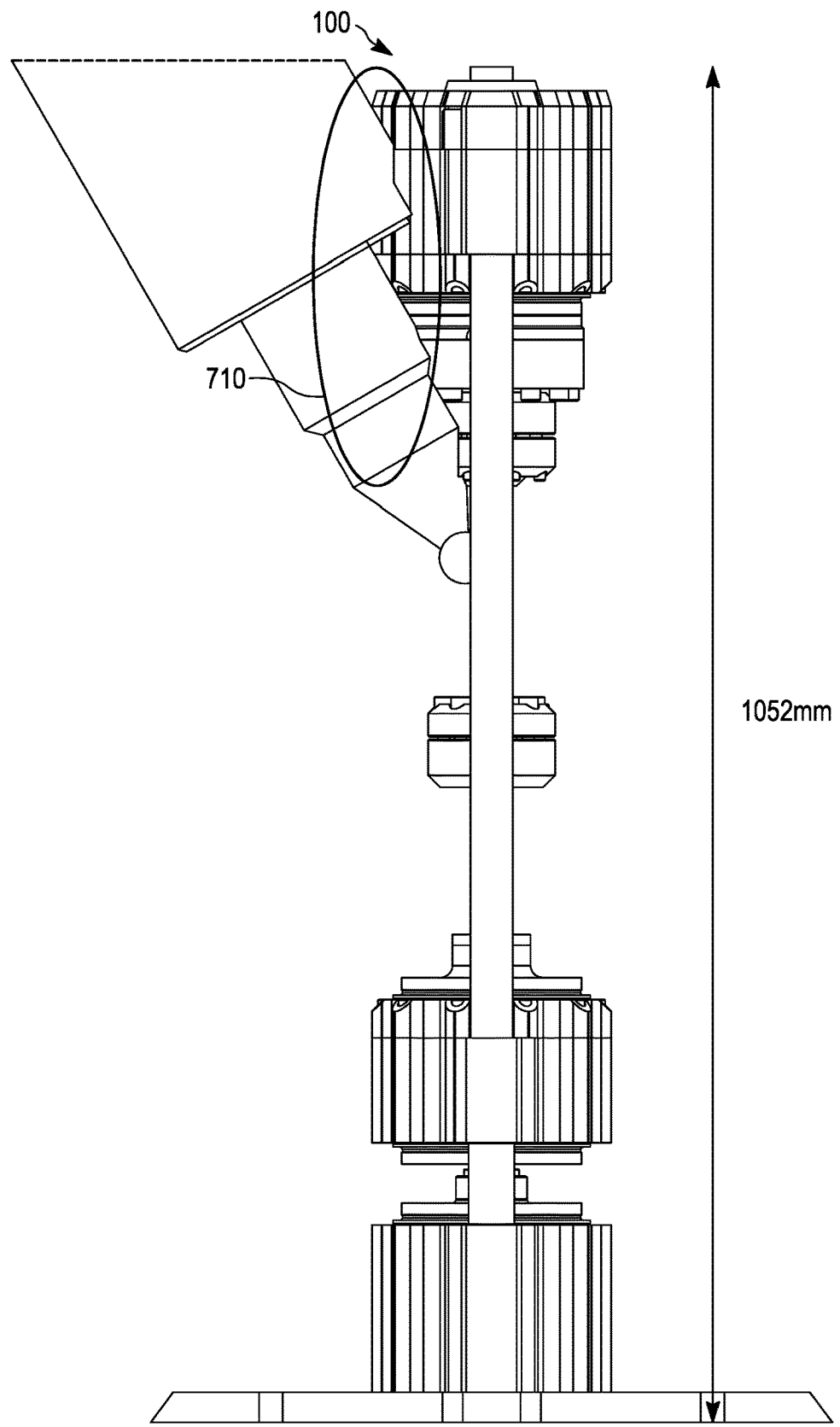
FIG. 7 illustrates example interference between a source and the load frame, in accordance with one or more embodiments disclosed herein.

An example interference 710 between the load frame 100 and the source 600, show in FIG. 7, can occur when the source 600 is disposed at an acute angle with respect to the load frame 100 that lacks a test sample grip extension, such as at least one of the test sample grip extensions, 510, 515, and/or 612. The interference 710 is shown proximate to the load cell 150, although interference can occur elsewhere.

Figure 8:
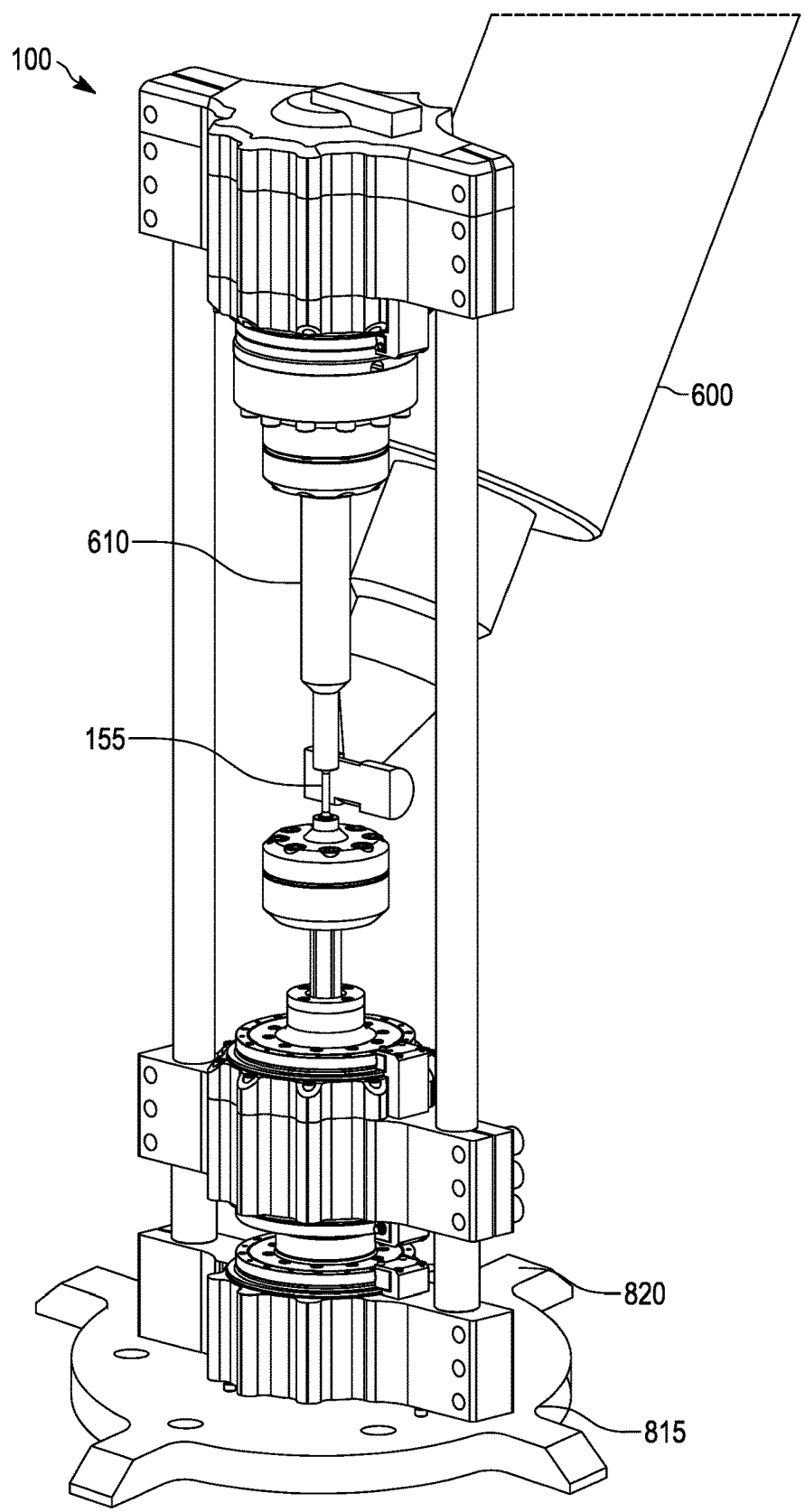
FIG. 8 illustrates an isometric view of the load frame shown in FIG. 6, in accordance with one or more embodiments disclosed herein.
Figure 9:
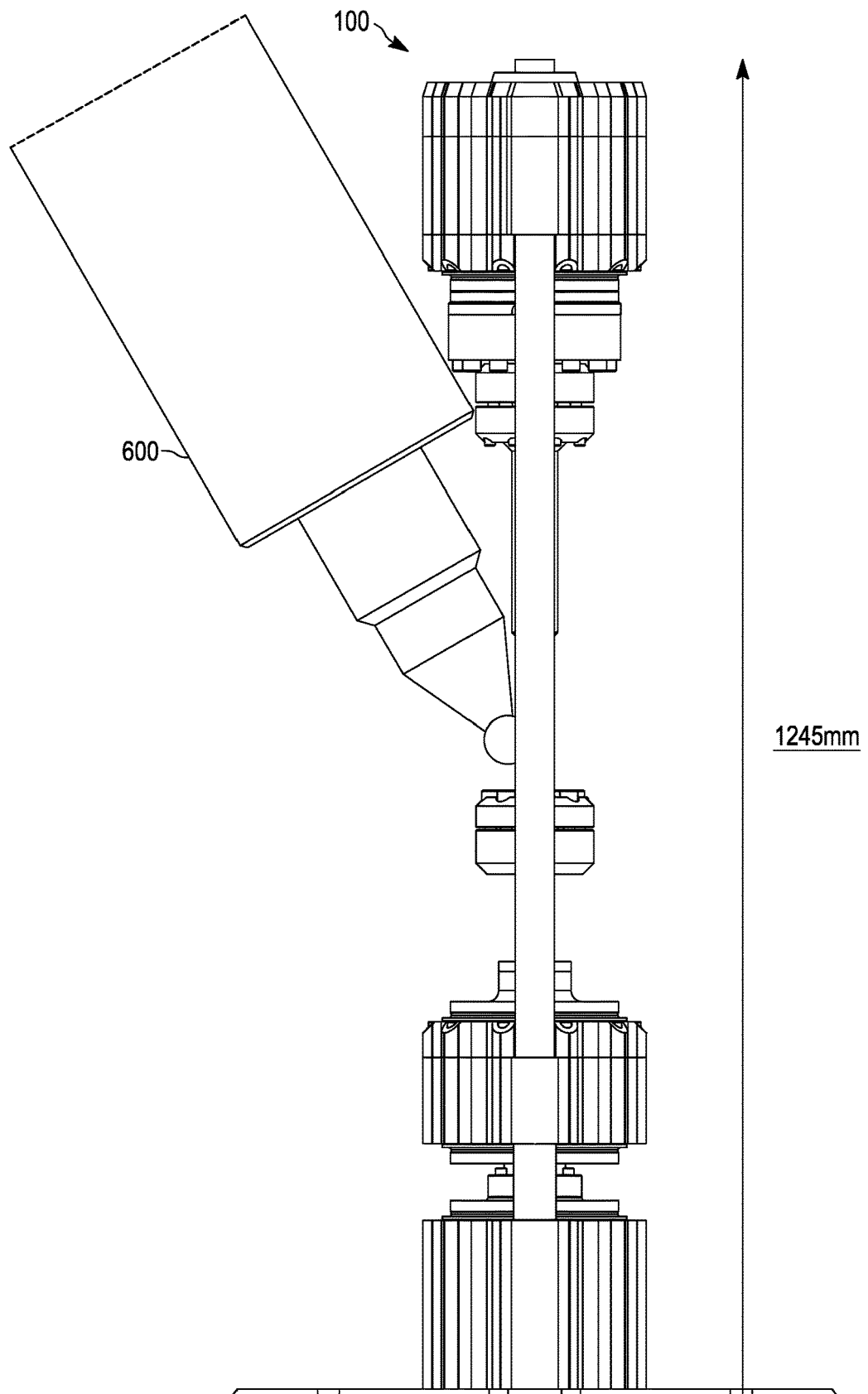
FIG. 9 illustrates a side view of the load frame 100 shown in FIG. 8, in accordance with one or more embodiments disclosed herein

FIG. 8 illustrates an isometric view of an example in which the load frame 100 utilizes the first test sample grip extension 610 shown in FIG. 6. In at least one embodiment, the first test sample grip extension 610 is used together with the second test sample grip extension 515 shown in FIG. 5. In at least one embodiment, another base plate 815 is coupled to the first ends 117, 122 of the first and second fixed posts 115, 120, respectively. In at least one embodiment, this other base plate 815 includes stabilizing arms 820 that extend from the other base plate 815 to stabilize the load frame 100 while loading and testing the test sample 155. FIG. 9 illustrates a side view of the load frame 100 shown in FIG. 8. As can be seen from FIGS. 8 and 9, the source 600 can be positioned very close to the test sample 155 without interference between the load frame 100 and the source 600.

Figure 10:
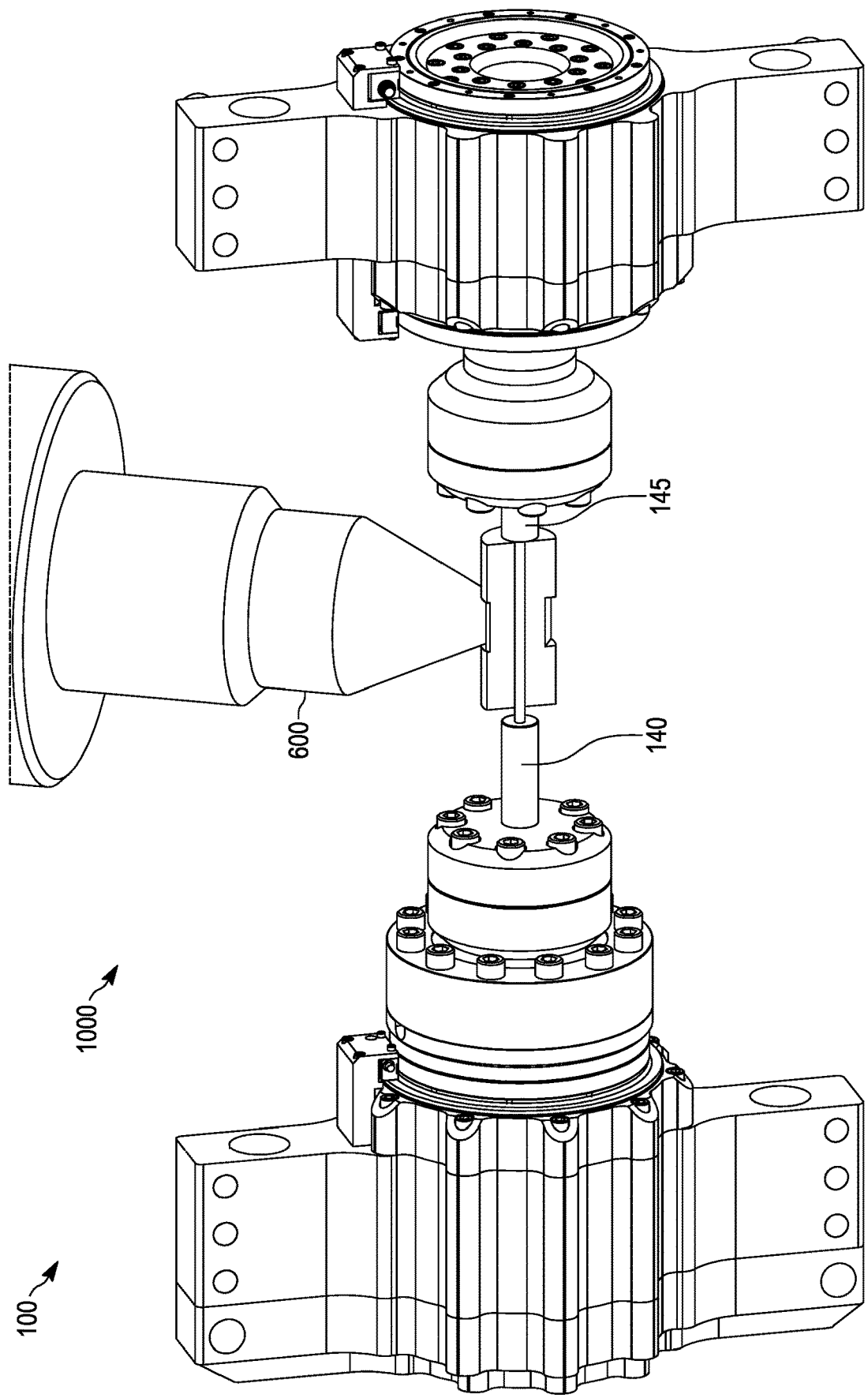
FIG. 10 illustrates an isometric view of an example substantially horizontal mounting configuration of the load frame, in accordance with one or more embodiments disclosed herein.
Figure 11:
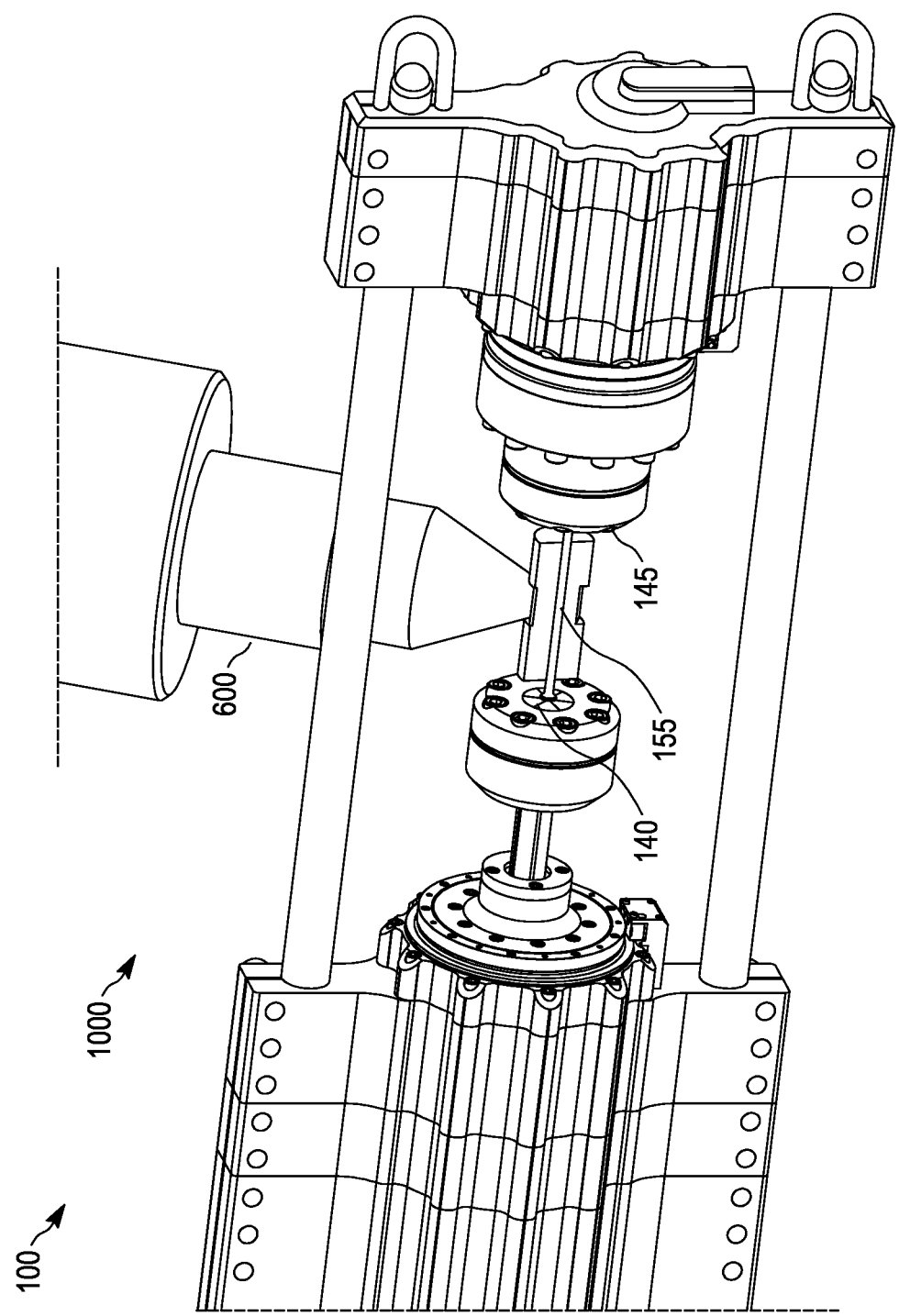
FIG. 11 illustrates another isometric view of the horizontal mounting configuration shown in FIG. 10, in accordance with one or more embodiments disclosed herein.

FIG. 10 illustrates an isometric view of an example substantially horizontal mounting configuration 1000 (e.g., +−8 degrees off horizontal) of the load frame 100. FIG. 11 illustrates another isometric view of the horizontal mounting configuration 1000 shown in FIG. 10. In this example, the load frame is illustrates as utilizing the first test sample grip 140 and the second test sample grip 145. The first fixed post 115 and the second fixed post 120 are not shown with horizontal mounting configuration 1000 in FIG. 10 for simplicity of illustration. Again, the source 600 can be placed very close to the test sample 155 without interference with the load frame 100, as shown. Lengths of the first test sample grip 140 and the second test sample grip 145 allow the source 600 to be placed extremely close to the test sample 155, as shown.

Figure 12:
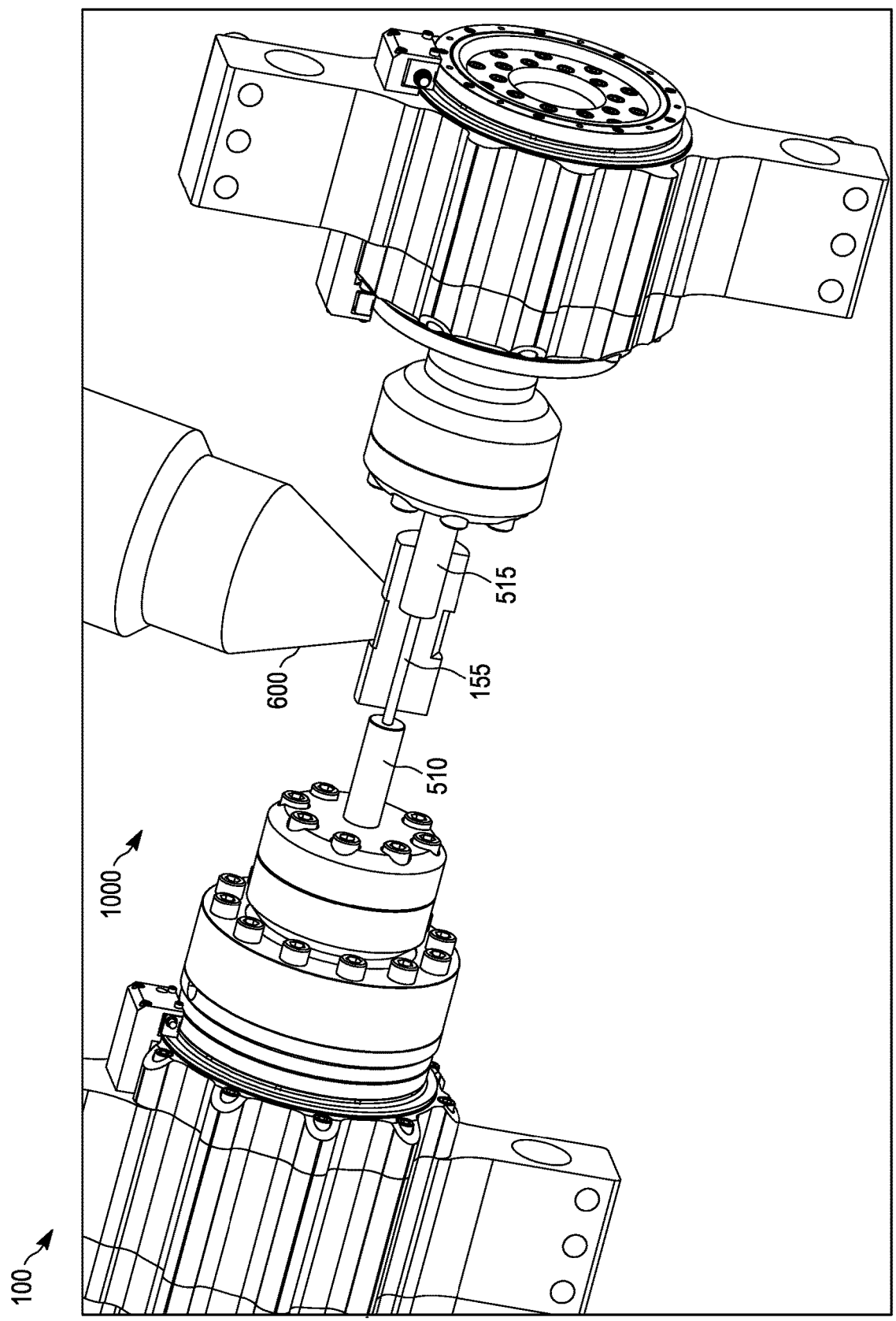
FIG. 12 illustrates an isometric view of the horizontal mounting configuration 1000 of the load frame utilizing test sample grip extensions, in accordance with one or more embodiments disclosed herein.
Figure 13:
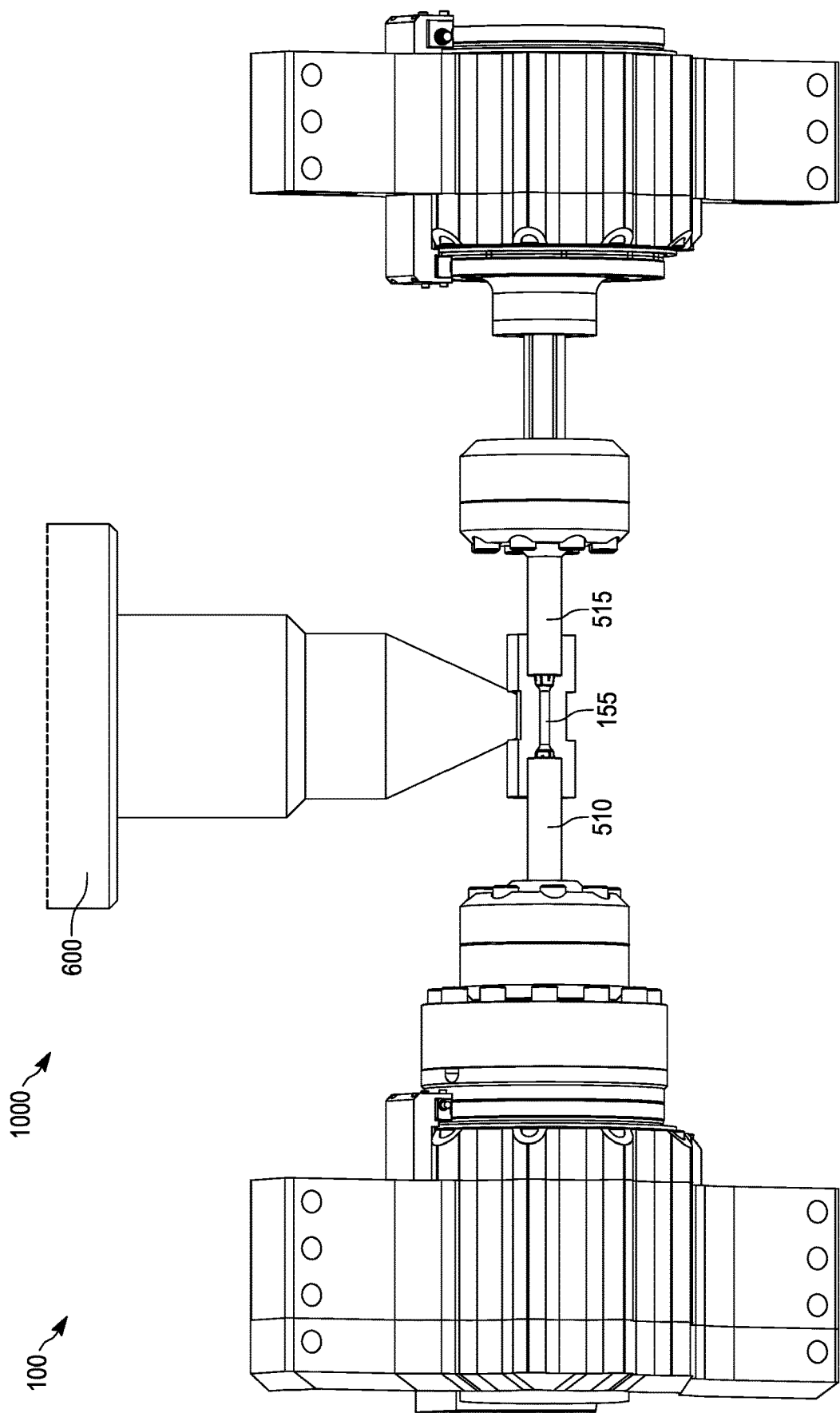
FIG. 13 illustrates a side view of the horizontal mounting configuration of the load frame shown in FIG. 12, in accordance with one or more embodiments disclosed herein.
Figure 14:
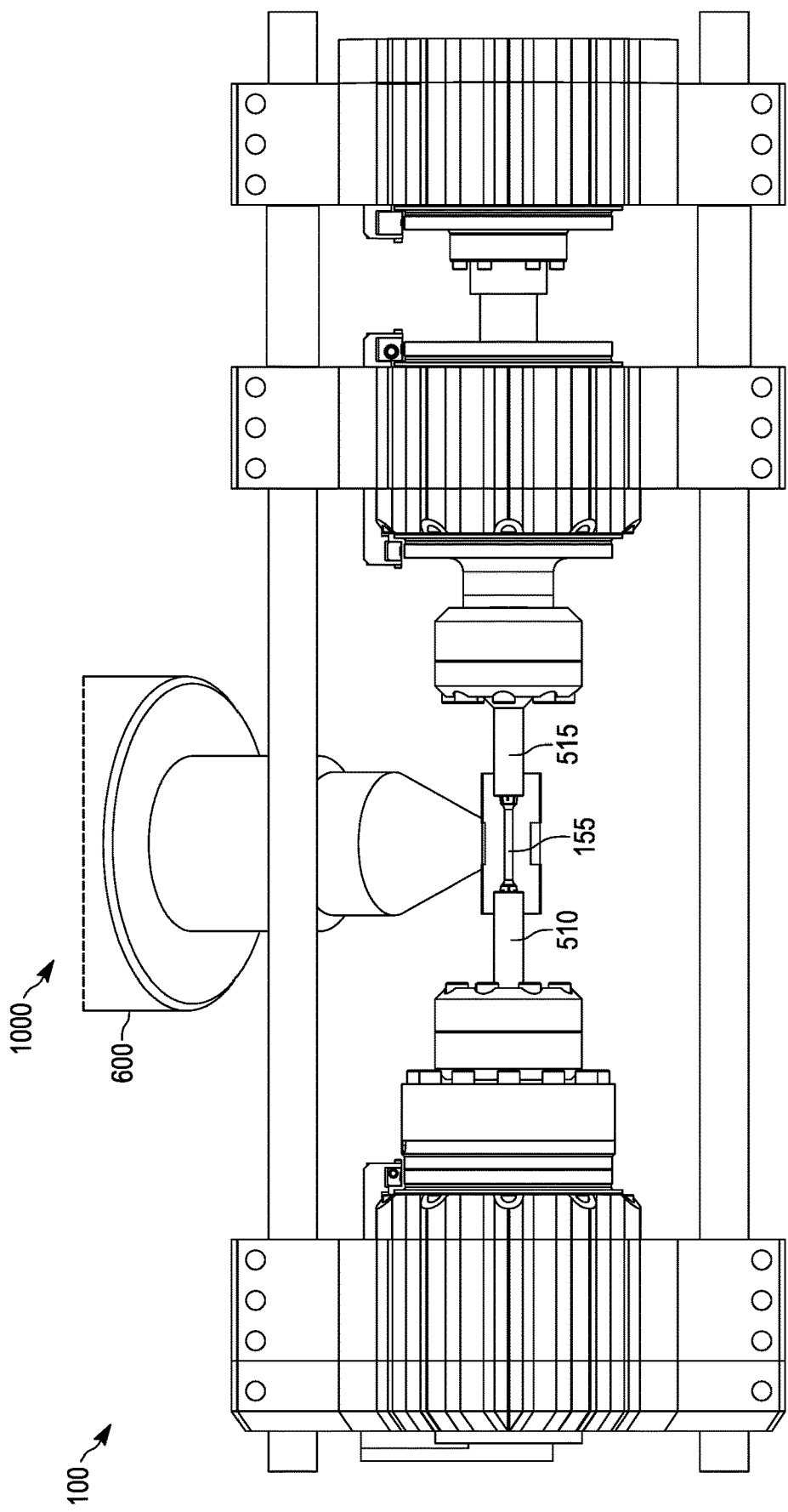
FIG. 14 illustrates another isometric view of the horizontal mounting configuration of the load frame shown in FIG. 12, in accordance with one or more embodiments disclosed herein.
Figure 15:
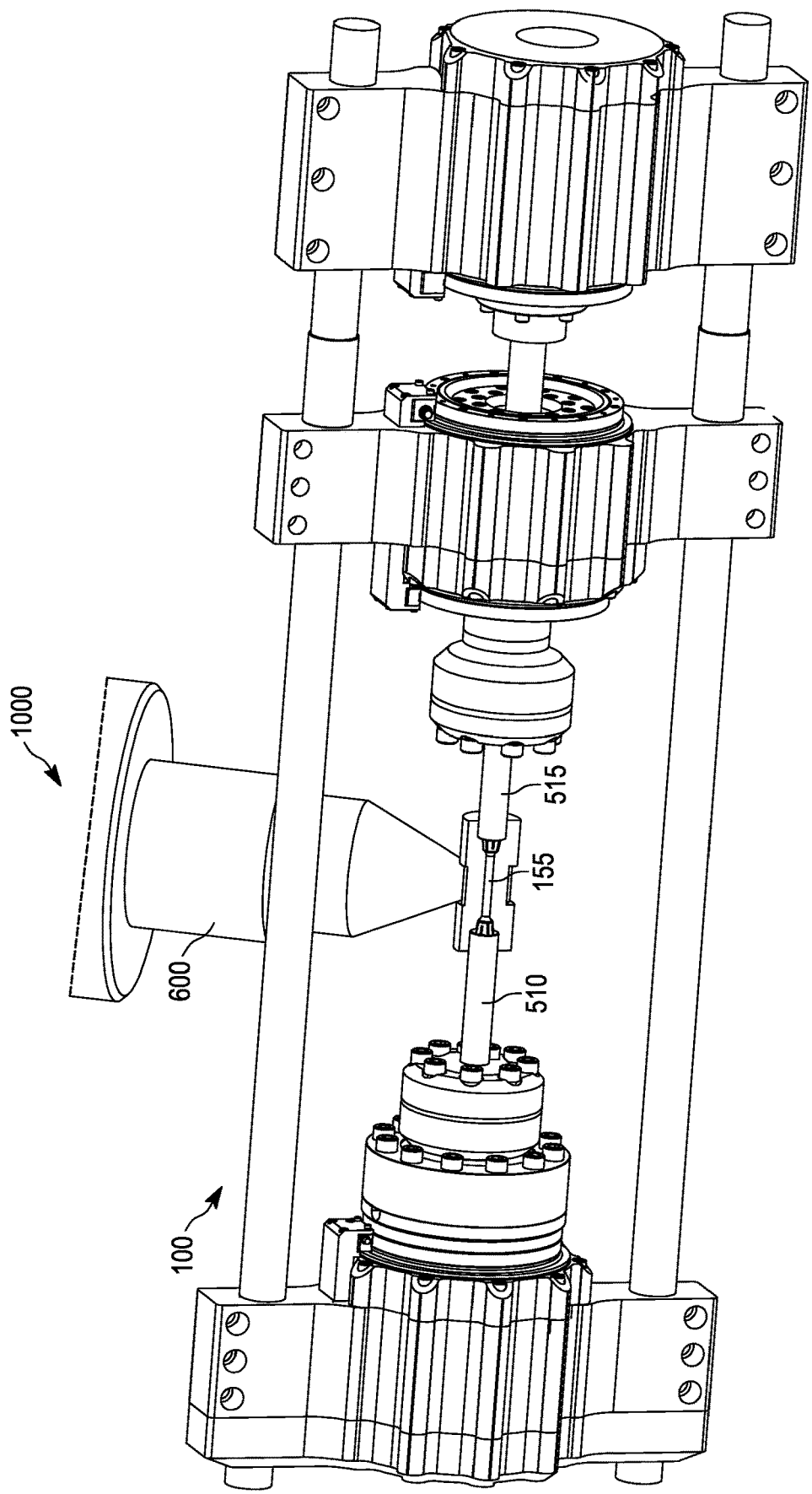
FIG. 15 illustrates yet another isometric view of the horizontal mounting configuration of the load frame shown in FIG. 12, in accordance with one or more embodiments disclosed herein.

FIG. 12 illustrates an isometric view of the horizontal mounting configuration 1000 of the load frame 100 utilizing test sample grip extensions, such as the first test sample grip extension 510 and the second test sample grip extension 515. FIG. 13 illustrates a side view of the horizontal mounting configuration 1000 of the load frame 100 shown in FIG. 12. FIG. 14 illustrates another side view of the horizontal mounting configuration 1000 of the load frame 100 shown in FIG. 12. FIG. 15 illustrates yet another isometric view of the horizontal mounting configuration 1000 of the load frame 100 shown in FIG. 12. Again, the source 600 can be placed very close to the test sample 155 without interference with the load frame 100, as shown.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:
1. An apparatus, comprising:
a base plate;
a first fixed post coupled to the base plate at one side thereof;
a second fixed post coupled to the base plate at the one side thereof;
a first actuator, coupled to the first fixed post and the second fixed post, to rotate a test sample along an axis that runs parallel to and halfway between the first fixed post and the second fixed post;
a second actuator, coupled to the first fixed post and the second fixed post, to displace the test sample along the axis that runs parallel to and halfway between the first fixed post and the second fixed post;
a third actuator, coupled to the first fixed post and the second fixed post, to rotate the test sample along the axis that runs parallel to and halfway between the first fixed post and the second fixed post;
a first test sample grip, coupled to the third actuator, to grip the test sample at a first end thereof; and
a second test sample grip, coupled to the second actuator, to grip the test sample at a second end thereof.

2. The apparatus of claim 1, further comprising:
a load cell, coupled to the third actuator and rotated by the third actuator, to generate an electrical signal, with a magnitude of the electrical signal being directly proportional to a force being applied to the test sample.

3. The apparatus of claim 2, wherein the load cell includes a rotating electrical connector.

4. The apparatus of claim 1, further comprising:
a strain wave gear coupled to the second actuator.

5. The apparatus of claim 1, further comprising:
a strain wave gear couple to the third actuator.

6. The apparatus of claim 1, further comprising:
a first nut; and
a second nut;
wherein the first actuator rotates the first nut coupled to the second actuator, and the second actuator rotates the second nut coupled to the second test sample grip.

7. The apparatus of claim 4, wherein the first nut is one of a roller screw nut and a ball screw nut.

8. The apparatus of claim 6, wherein the second nut is a spline nut.

9. The apparatus of claim 1, wherein the first test sample grip and the second test sample gripe are axisymmetric grips.

10. The apparatus of claim 1, wherein the first actuator, the second actuator, and the third actuator are coaxial servo-actuators.

11. The apparatus of claim 1, wherein the first test sample grip and the second test sample grip are collet grips.

12. A scanning system comprising:
the apparatus of claim 1; and
a temperature chamber;
wherein the apparatus is disposed within the temperature chamber during testing of the test sample, the temperature chamber at least one of heating and cooling the test sample during the testing of the test sample.

13. A scanning system comprising:
the apparatus of claim 1;
a source; and
a detector;
Wherein the first actuator and the third actuator are configured to rotate in a coordination to rotate the test sample for an analysis of the test sample without an obstruction by the first fixed post and the second fixed post.

14. The scanning system of claim 13, wherein the source is an X-ray source and the detector is an X-ray detector.

15. A method, comprising:
coupling a first fixed post to a base plate at one side thereof;
coupling a second fixed post to the base plate at the one side thereof;
coupling a first actuator to the first fixed post and the second fixed post;
coupling a second actuator to the first fixed post and the second fixed post, the second actuator to apply at least one of a torsional force and an axial force to a test sample;
coupling a third actuator to the first fixed post and the second fixed post, the first actuator and the third actuators to rotate in a coordination to rotate the test sample along an axis that runs parallel to and halfway between the first fixed post and the second fixed post;
coupling a first test sample grip to the third actuator, the first test sample grip to grip the test sample at a first end thereof; and
coupling a second test sample grip to the second actuator, the second test sample grip to grip the test sample at a second end thereof.

16. The method of claim 15, further comprising:
coupling a first strain wave gear to the second actuator; and
coupling a second strain wave gear to the third actuator.

17. The method of claim 15, further comprising:
rotating, by the first actuator, one of a roller screw nut and a ball screw nut coupled to the second actuator; and
rotating, by the second actuator, a spline nut coupled to the second test sample grip.

18. The method of claim 17, wherein the rotating further includes:
rotating the test sample by the first actuator and the second actuator for an analysis of the test sample without an obstruction by the first fixed post and the second fixed post.

19. The method of claim 15, wherein the first test sample grip and the second test sample grips are axisymmetric grips.

20. The method of claim 15, wherein the first actuator, the second actuator, and the third actuators are coaxial servo-actuators.

21. The method of claim 15, further comprising:
coupling a load cell to the third actuator, the load cell to generate an electrical signal, with a magnitude of the electrical signal being directly proportional to a force being applied to the test sample.

* * * * *